US009871606B1

(12) United States Patent
Carroll et al.

(10) Patent No.: US 9,871,606 B1
(45) Date of Patent: Jan. 16, 2018

(54) IDENTIFICATION OF CONCURRENTLY BROADCAST TIME-BASED MEDIA

(71) Applicant: Twitter, Inc., San Francisco, CA (US)

(72) Inventors: Andrew John Carroll, West Newton, MA (US); Jeremy Rishel, Maynard, MA (US); Richard Douglas Whitcomb, Jr., Winchester, MA (US); Mark Watabe, Cambridge, MA (US); Noah Vihinen, Wenham, MA (US); Indranrita Deshmukh, Cambridge, MA (US); Artur B. Adib, Essex Junction, VT (US); Michael Ben Fleischman, Somerville, MA (US); Deb Kumar Roy, Arlington, MA (US)

(73) Assignee: Twitter, Inc., San Francisco, CA (US)

( * ) Notice: Subject to any disclaimer, the term of this patent is extended or adjusted under 35 U.S.C. 154(b) by 533 days.

(21) Appl. No.: 14/277,040

(22) Filed: May 13, 2014

Related U.S. Application Data

(60) Provisional application No. 61/822,852, filed on May 13, 2013.

(51) Int. Cl.
*G06F 17/00* (2006.01)
*H04H 60/56* (2008.01)
(Continued)

(52) U.S. Cl.
CPC .......... *H04H 60/56* (2013.01); *H04H 60/372* (2013.01); *H04H 60/52* (2013.01)

(58) Field of Classification Search
CPC ......... G06F 17/30743; G06F 17/30778; G06F 17/30858; G06F 17/30864; G06F 17/30867; G06F 17/3087; G06F 17/30964; G06F 17/30967; G06F 17/3097; G06F 17/30973; G06F 17/30976; G06F 17/30979; G06F 17/30982; G06F 17/30985; G06F 17/30988; G06F 17/30991; H04N 21/2225; H04N 21/2665
See application file for complete search history.

(56) References Cited

U.S. PATENT DOCUMENTS

| | | | | |
|---|---|---|---|---|
| 9,020,415 | B2 * | 4/2015 | Buehler ................. | H04H 60/31 455/3.02 |
| 2011/0022638 | A1 * | 1/2011 | Jiang ................. | G06F 17/30743 707/797 |

(Continued)

*Primary Examiner* — Fan Tsang
*Assistant Examiner* — Eugene Zhao
(74) *Attorney, Agent, or Firm* — Fenwick & West LLP

(57) ABSTRACT

A real time messaging platform identifies an audio snippet of a time-based media (TBM) event. The messaging platform maintains a real time repository of concurrently broadcasting TBM events as well as a historical repository of previously broadcast TBM events. These repositories contain acoustic fingerprints of their respective TBM events. The messaging platform matches an acoustic fingerprint of the audio snippet with one of the stored acoustic fingerprints to identify the TBM event in the recorded snippet. To identify the TBM event, the messaging platform matches multiple overlapping reference audio segments of the reference audio stream with multiple test audio segments of the audio snippet. This allows the platform to account for time delays between the test and reference audio segments that would otherwise hinder the matching process.

31 Claims, 6 Drawing Sheets

(51) Int. Cl.

| | |
|---|---|
| ***H04H 60/37*** | (2008.01) |
| ***H04H 60/52*** | (2008.01) |

(56) References Cited

U.S. PATENT DOCUMENTS

| | | | | |
|---|---|---|---|---|
| 2011/0289098 | A1 * | 11/2011 | Oztaskent | G06F 17/30026 707/769 |
| 2013/0052939 | A1 * | 2/2013 | Anniballi | H04H 60/44 455/3.01 |

* cited by examiner

IDENTIFICATION OF CONCURRENTLY BROADCAST TIME-BASED MEDIA

CROSS REFERENCE TO RELATED APPLICATION

This application claims the benefit of U.S. Provisional Application No. 61/822,852, filed May 13, 2013, which is incorporated by reference in its entirety.

BACKGROUND

Online social media services, such as social networking sites, news aggregators, blogs, and the like provide a rich environment for users to comment on events of interest and communicate with other users. Messages and other social media content items contributed by users of these social media services often include indirect/colloquial references to events that appear in time-based media (TBM) events such as television shows, news reports, sporting events, concert performances, awards shows, radio programs, festivals, competitions, and the like. Other users who are familiar with the TBM event may recognize these references in messages, but users unfamiliar with the TBM event may not. Consequently, these users may resort to searching through alternative sources of information to understand a reference in a message. Thus, consumers of messages about TBM events would benefit from a more explicit labeling of what TBM event a user is commenting on in a message.

Media recognition technologies provide for identifying unknown snippets of TBMs, but these methods are computationally intensive and typically assume that the unknown snippet is temporally aligned with a matching identifier. If the TBM is concurrently airing, however, then a recorded snippet of the TBM is likely to be temporally misaligned relative to the matching identifier. There are a number of reasons temporal alignment issues can arise. For example, there are often time delays between the recording of the snippet and the broadcasting of the TBM event that generates the matching identifier. There is also usually a time delay in generating the snippet, encoding it if necessary, and communicating it for identification. As a result, current techniques are ill-suited for identifying concurrently broadcasting TBM.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
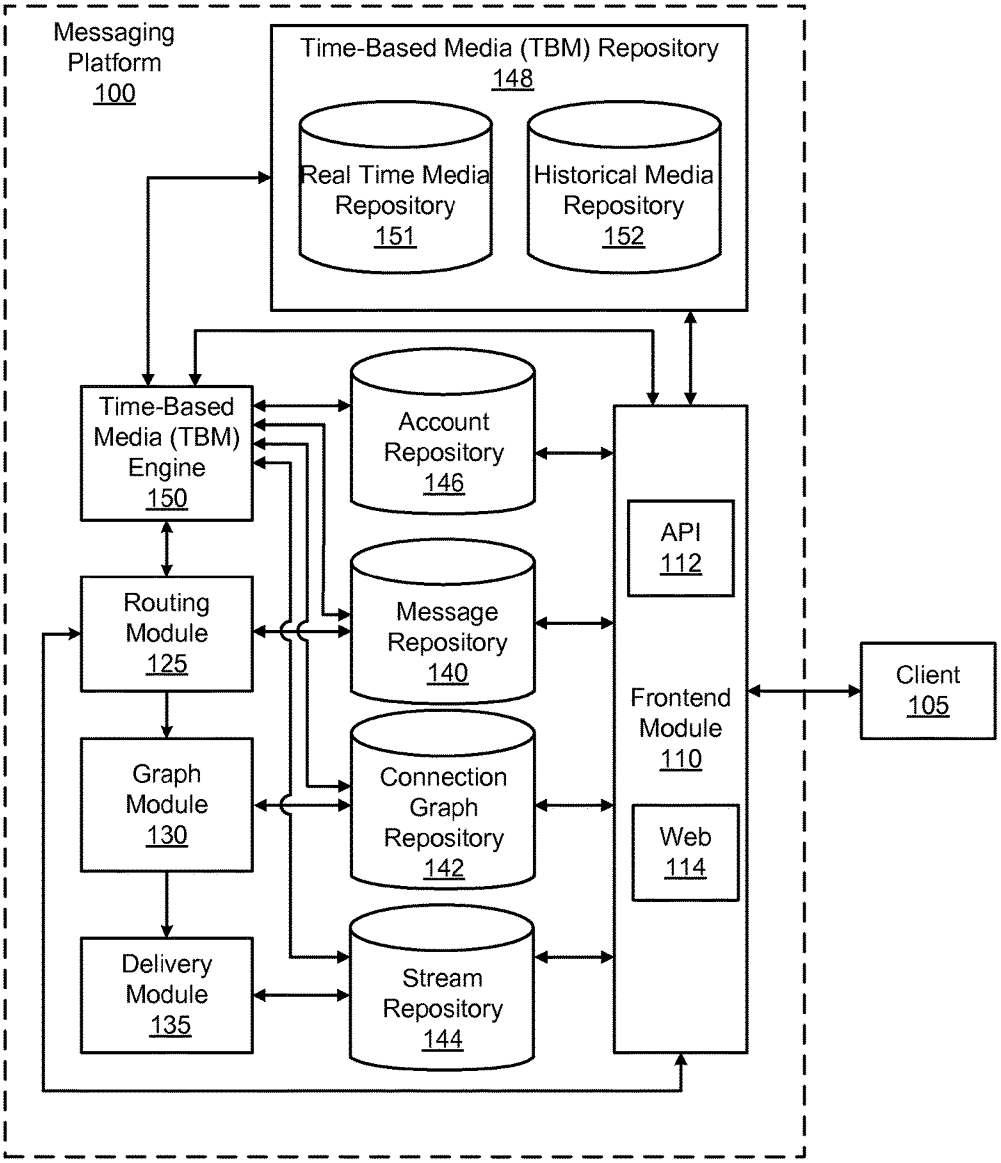
FIG. 1 is a block diagram of a real time messaging platform, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

One embodiment of a real time messaging system, method, and non-transitory computer readable storage medium that includes identifying an unknown time-based media (TBM) event in an audio snippet using an reference audio stream of a concurrently broadcasting version of the TBM event. The TBM event in the audio snippet may also be identified from an reference audio stream corresponding to a previously broadcast TBM event.

A request to identify a TBM event is received from a client device. The request includes an audio snippet, and acoustic fingerprints are generated from the audio snippet. A real time TBM repository containing acoustic fingerprints of currently broadcasting TBM events is searched for acoustic fingerprints matching acoustic fingerprints of the audio snippet. Concurrently with searching the real time TBM repository, a historical TBM repository containing acoustic fingerprints of previously broadcast TBM events is searched for matching acoustic fingerprints to the audio snippet. Using the one or more matching acoustic fingerprints from the real time TBM repository or the historical TBM repository, a matching TBM event is identified, and an identification of the matching TBM is transmitted in response to the request.

Various types of acoustic fingerprints may be used. To facilitate matching the audio snippets to concurrently broadcasting TBM content, one embodiment uses acoustic fingerprints each generated for segments of audio between a start time and an end time (e.g., in a received audio snippet, in a stream of audio). An acoustic fingerprint for an audio segment includes audio features generated from within time the audio segment. Such acoustic fingerprints are generated from a reference audio stream of a concurrently broadcasting TBM event. Reference audio segments are identified from this reference audio stream such that each reference audio segment has a different start time and end time within the reference audio stream. For each of the reference audio segments, a plurality of reference audio features are generated. Each reference audio feature has a reference feature time indicating when the reference audio feature occurs relative to the start time of the audio segment. Generated reference audio segments are stored in a media repository of recently received reference audio segments.

These reference audio segments are used to identify an audio snippet from a client device associated with an account. Test audio segments are identified from the audio snippet such that the test audio segments overlap. In other words, an end time of a prior one of the test audio segments is after a start time of at least one subsequent one of the test audio segments. For each of the test audio segments, a plurality of test audio features are generated, each of which is associated with a test feature time indicating when the test audio feature occurs relative to a start time of the test audio segment.

One or more test audio features are determined to match one or more reference audio features, implying that a test audio segment containing the test audio features matches a reference audio segment containing the reference audio features. Accordingly, the audio snippet contains content from the concurrently broadcasting TBM event in the reference audio stream. In response to determining that the test audio segment matches the reference audio segment, an association is stored between the account and the concurrently broadcasting TBM event. This association may be used to send additional content related to the broadcast TBM event to a client device associated with the account. An identification of the TBM event is sent to the client device that requested identification of the audio snippet.

The features and advantages described in the specification and in this summary are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

II. Real Time Messaging Platform Overview

A real time messaging platform identifies audio snippets of TBM events received from a client device. TBM include means of communication that conveys meaning over time. Example TBM include broadcasted, streamed, or recorded audio and video (e.g., television, radio, movies, music, animations). TBM may be experienced through playback of stored TBM at the convenience of one or more media consumers. In particular, embodiments are directed towards TBM events, where many media consumers experience transmitted TBM at substantially the same time. TBM events include transmissions of a live event (e.g., a newscast, a sports competition, an awards ceremony, a competition, a concert, a festival, a television episode premier, a book reading, an educational lecture) as well as transmissions of a previous event (e.g., a television show re-run, a movie, a sports replay, a time-delayed presentation of a live event). TBM events may be broadcast through television networks (e.g., traditional broadcast television, cable, and satellite), radio networks (e.g., broadcast radio, satellite radio), or the Internet (e.g., video and/or audio streaming), for example. Broadcasting includes broadcasts available to the general public as well as multicasts to a particular audience (e.g., paying media consumers, members of a group, individuals selected by a broadcaster). In one embodiment, media consumers who are account holders of a messaging platform record audio snippets of concurrently broadcast TBM events for identification by the messaging platform.

FIG. 1 is a block diagram of a real time messaging platform, according to one embodiment. The real time messaging platform 100 includes a frontend module 110, a routing module 125, a graph module 130, a delivery module 135, a message repository 140, a connection graph repository 142, a stream repository 144, an account repository 146, a time-based media (TBM) repository 148, and a time-based media (TBM) engine 150.

The messaging platform 100 allows account holders to create, publish, and view messages in a message stream visible to themselves and other subscribing accounts of the messaging platform 100. Account holders compose messages using a client software application running on a client computing device 105 (also referred to as a client 105), such as a mobile phone, a tablet, a personal computer (laptop, desktop, or server), or a specialized appliance having communication capability. The client software application may include a web-based client, a Short Messaging Service (SMS) interface, an instant messaging interface, an email-based interface, an API (application programming interface) function-based interface, etc. The client computing devices 105 communicate with the messaging platform via a network such as the internet.

II. A. Message Composition with a Real Time Messaging Platform

Messages are containers for a variety of types of computer data representing content provided by the composer of the message. Types of data that may be stored in a message include text (e.g., a 140 character "Tweet"), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client 105).

The messages composed by one account holder may also reference other accounts. For example, a message may be composed in reply to another message composed by another account holder. Messages may also be repeats (or reposts) of a message composed by another account holder. Reposts may also be referred to as "retweets." Generally, an account referenced in a message may both appear as visible content in the message (e.g., the name of the account), and may also appear as metadata in the message. As a result, the messaging platform is able to allow the referenced accounts to be interactive. For example, clients 105 may interact with account names that appear in their message stream to navigate to the message streams of those accounts. The messaging platform 100 allows messages to be private, such that a composed message will only appear in the message streams of the composing and recipient accounts.

The frontend module 110 receives composed messages from the clients 105, interfaces with other internal components of the messaging platform 100, and distributes message streams to account holders. The frontend module 110 may provide a variety of interfaces for interacting with a number of different types of clients 105. For example, when an account holder uses a web-based client 105 to access the messaging platform 100 (e.g., through an Internet browser), a web interface module 114 in the front end module 110 can be used to provide the client 105 access. Similarly, when an account holder uses an API-type client 105 to access the messaging platform 100 (e.g., through an application native to an operating system of the client 105), an API interface module 112 can be used to provide the client 105 access.

The routing module 125 stores newly composed messages received through the frontend module 110 in a message repository 140. In addition to storing the content of a message, the routing module 125 also stores an identifier for each message. This way, the message can be included in a variety of different message streams without needing to store more than one copy of the message.

II. B. Connections in a Real Time Messaging Platform

The graph module 130 manages connections between account holders, thus determining which accounts receive which messages when transmitting message streams to clients 105. Generally, the messaging platform 100 uses unidirectional connections between accounts to allow account holders to subscribe to the message streams of other account holders. By using unidirectional connections, the messaging platform allows an account holder to receive the message stream of another account, without necessarily implying any sort of reciprocal relationship the other way. For example, the messaging platform 100 allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account holder's message stream is referred to as a "follower", and the act of creating the unidirectional connection is referred to as "following" another account holder. The graph module 130 receives requests to create and delete unidirectional connections between account holders through the frontend module 110. These connections are stored for later use in the connection graph repository 142 as part of a unidirectional connection graph. Each connection in the connection graph repository 142 references an account in the account repository 146.

In the same or a different embodiment, the graph module 130 manages connections between account holders using bidirectional connections between account holders. Upon establishing a bidirectional connection, both accounts are considered subscribed to each other's account message stream. The graph module stores bidirectional connections in the connection graph repository 142 as part of a social graph. In one embodiment, the messaging platform and connection graph repository 142 include both unidirectional and bidirectional connections.

II. C. Message Delivery with a Real Time Messaging Platform

The delivery module 135 constructs message streams and provides them to requesting clients 105 through the frontend module 110. Responsive to a request for a message stream of a requested account holder, the delivery module constructs a message stream in real time. This may include providing messages from subscribed account holders who are mutually connected to the messaging platform during concurrent sessions (e.g., simultaneously). However, it may also include messages authored not in real time and/or via account holders that are not simultaneously connected to the messaging platform with the requesting account holder (also referred to as the contextual account holder). The contents of a message stream for a requested account holder may include messages composed by the requested account holder, messages composed by the other account holders that the requested account holder follows, messages authored by other account holders that reference the requested account holder, and in some cases advertisement messages selected by the messaging platform 100. The messages of the message stream may be ordered chronologically by time and date of authorship, or reverse chronologically. Other orderings may also be used.

There may be a large number of possible messages that might be included in the message stream. The delivery module 135 identifies a subset of the possible messages for inclusion in the message stream. For example, the delivery module 135 orders the subset of messages by time of composition or any other item of information available regarding the messages. The delivery module 135 stores the message stream in a stream repository 144. The stored message stream may include the entire contents of each of the messages in the stream, or it may include pointers that point to the location of the message in the message repository 140. The delivery module 135 provides the message stream to the requesting client 105 through the frontend module 110.

Clients 105 of the messaging platform 100 allow account holders to engage (e.g., interact) with the messages in message streams. There are a number of different types and categories of interactions. Types of engagement include clicking/selecting a message for more information regarding the message, clicking/selecting a URL (universal resource locator) or hashtag in a message, reposting the message, or favoriting a message. Other example engagements types include expanding a "card" message, which presents additional content when an account holder engages with the card message. Account holders may engage further with content contained in the expanded card message (e.g., playing a video or audio file, streaming a concurrently broadcast TBM event, voting in a poll).

The frontend module 110 allows account holders to manage their account with the messaging platform 100. The account holder can manage privacy, security, and advertising settings as well as directly manage their connections to other accounts. Generally, the messaging platform 100 does not require the account to contribute a large amount of personal information. The frontend module 110 allows the account holder to identify an account name (not necessarily a real) name, provides pictures of media, provide a brief description of themselves/their entity, and a website. However, the messaging platform 100 does not necessarily request or store traditional real-world identifying information such as age, gender, interests, history, occupation, etc. Instead, the messaging platform 100 is configured to infer information about the account holder based on the accounts they follow, the accounts that follow them, the messages they compose, and the messages they engage with. Any information explicitly provided or inferred about the account is stored in the account repository 146.

II. D. TBM Identification with the Real Time Messaging Platform

The frontend module 110 may also provide an interface presented through a client 105 to identify TBM. This interface may include an audio capture element to enable audio capture upon account holder request in response to a user input. Example user interface elements include a button, an icon, descriptive text, a voice command, or a gesture command, or another indication associated with audio capture. User input includes forms of interaction with the client 105 such as a voice command, a gesture or selection on a touchscreen, a selection by a mouse, a keyboard input, or another input detectable by the client 105. In response to the user input to the audio capture element, the client 105 initiates recording of an audio snippet. The client 105 may cease recording in response to an additional user input, after the client 105 has recorded more than a threshold duration of time, or in response to a signal from the messaging platform 100. The client 105 sends the audio snippet to the messaging platform 100 through the frontend module 110. The client 105 may send the audio snippet concurrently as the audio snippet is recorded or in response to completing a recording of the audio snippet.

Recorded audio snippets received through the frontend module 110 are sent to the TBM engine 150, which identifies the audio snippet with a TBM event. The TBM engine 150 generates acoustic fingerprints from the audio snippet. Acoustic fingerprints are a digital identifier of a segment of audio that is condensed relative to the original segment of audio. Acoustic fingerprints may be generated by analyzing acoustic qualities (e.g., amplitude, frequency, tempo, bandwidth) of an audio signal and generating a digital representation of those acoustic qualities. The open source acoustic fingerprinting software AcoustID is an example of an acoustic fingerprinting tool. Generating an acoustic fingerprint from a segment of audio may include compressing the audio or/or filtering the audio (e.g., to remove frequencies characteristic of signal noise or frequencies with low amplitude). In one embodiment, the TBM engine 150 generates an acoustic fingerprint including various audio features detected within that segment. Such features correspond to portions within an audio segment where an audio property (e.g., amplitude at a frequency, bandwidth, rate of zero crossings) meets certain logical conditions (e.g., exceeding or falling below a threshold, deviating from an average value by a threshold amount). The TBM engine 150 may also perform preprocessing (e.g., acoustic filtering, normalization) of the audio snippet to account for properties of the microphone or placement of the microphone. For example, the TBM engine 150 applies different acoustic filters depending on the device type of the client 105 (e.g., make, model, brand) to remove a noise pattern characteristic of a microphone embedded in the client 105. The TBM engine 150 stores generated TBM fingerprints in the TBM repository 148.

The TBM engine 150 uses generated TBM fingerprints to query the TBM repository 148 to identify matching TBM fingerprints. More specifically, the TBM repository 148 includes a real time repository 151 of concurrently broadcasting TBM and a historical repository 152 of previously broadcasted or distributed TBM. Often, the TBM engine 150 will perform such a query to identify an unknown TBM that has been generated by the client 105. If the TBM repository 148 contains a TBM fingerprint matching the acoustic fingerprint of the audio snippet from the client 105, then the TBM engine 150 may indicate the match and also may store an association between the TBM event and the client 105 and the messaging platform account that submitted the audio snippet for identification.

In response to identifying a TBM event, the TBM engine 150 may send an identifier or attributes of the TBM event to the client 105 through the frontend module 110. In turn, the client 105 may display a name of the TBM event and request confirmation that the audio snippet was matched correctly to the TBM event. In this example, the user interface displays a confirmation message (e.g., "Is this the program you are viewing?") and presents an option to confirm or deny the match (e.g., "yes" and "no" buttons).

In response to identifying a TBM event, the frontend module 110 may prompt the account holder to author a message about the identified TBM event. For example, the client 105 presents a pre-composed message to the account holder with an identifier (e.g., a name, a pointer to a messaging platform account or website associated with the TBM event). The pre-composed message may also contain a pointer to an interface (e.g., a video or audio player) that presents a stream of the broadcast TBM event to an account holder viewing the message. The account holder may edit the pre-written message and send a request to broadcast the message to the social media platform 100. In addition to composing a message explicitly associated with an identified TBM event, the frontend module 110 may present an interface of companion content to the TBM event. This TBM event content may include summary information about a TBM event (e.g., scoring information for a sports event, race standings for a competition, award nominees for an awards ceremony) or supplemental content (e.g., additional interviews for a reality TV show, director commentary for a television show).

III. TBM Engine

Figure 2:
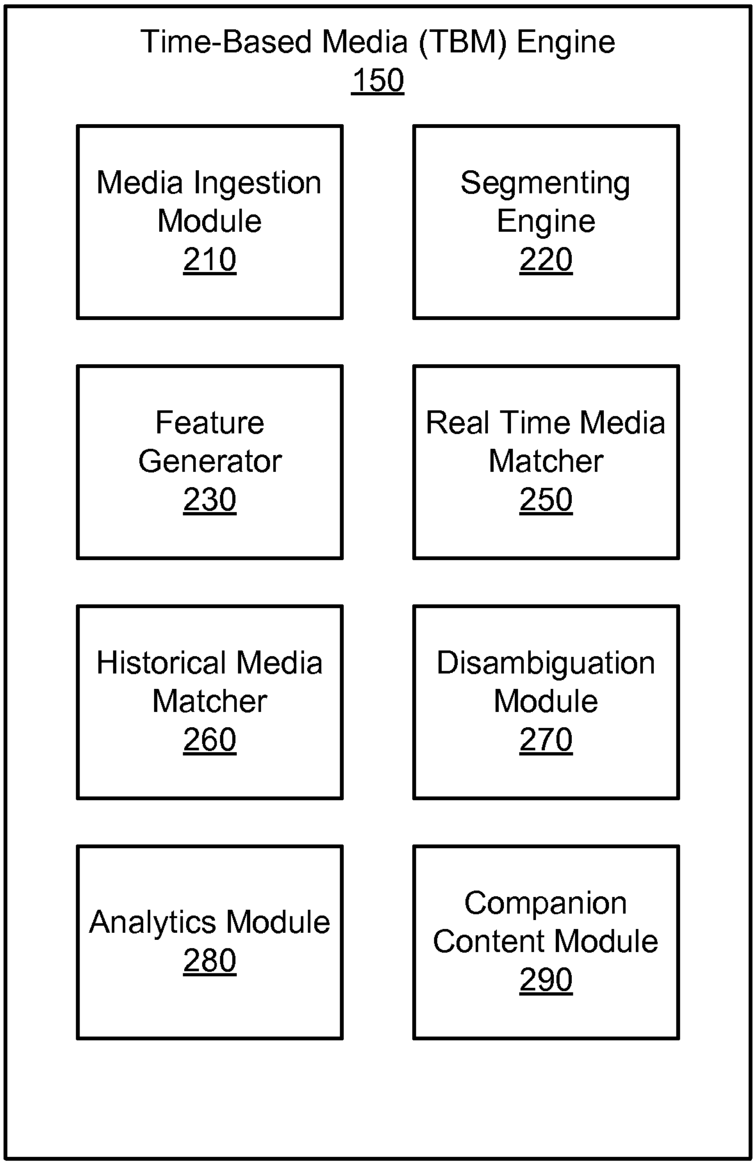
FIG. 2 is a block diagram of a time-based media engine, according to one embodiment.

FIG. 2 is a block diagram of a TBM engine 150, according to one embodiment. The TBM engine 150 includes a media ingestion module 210, a segmenting engine 220, a feature generator 230, a real time media matcher 250, a historical media matcher 260, a disambiguation module 270, an analytics module 280, and a companion content module 290.

The TBM engine 150 identifies a received audio snippet as matching a concurrently broadcast TBM event or a historical TBM event. The media ingestion module 210 receives reference streams of concurrently broadcast TBM and previously broadcast TBM to populate the real time TBM repository 151 and the historical TBM repository 152. The segmenting engine 220 and the feature generator 230 produce the segments and the audio features used to match the audio snippet, respectively. The real time media matcher 250 and historical media matcher 260 query the real time TBM repository 151 and the historical TBM repository 152, respectively, to match the audio snippet to a TBM event. The real time media matcher 250 and/or the historical media matcher 260 may identify more than one possible match for an audio snippet, so the disambiguation module 270 selects a matching TBM event from the identified possible matches. The analytics module 280 and companion content module 290 use the matched identity of the audio snippet to deliver relevant content to the account.

III. A. Reference Stream Ingestion

The media ingestion module 210 receives reference streams of concurrently broadcasting TBM events. Example reference streams include various television channels. Because a television channel may broadcast different programs in different geographic regions at the same time, the media ingestion module 210 may receive multiple streams of a television channel corresponding to different geographic regions. The media ingestion module 210 may also receive other reference streams from radio broadcasts in various geographic regions as well as reference streams broadcast through various Internet websites. In addition to widely broadcast TBM, the media ingestion module 210 may receive reference streams recorded at an event but not necessarily available through typical TBM sources. For example, the media ingestion module 210 receives a reference stream recorded live at a concert or festival. The various reference streams from the media ingestion module 210 may be segmented by the segmenting engine 220 and analyzed by the feature generator 230 to generate audio features stored in the real time repository 151.

The media ingestion module 210 also receives previously recorded broadcast TBM events or TBM events that have never been broadcast. Example sources of previously broadcast TBM events are recorded media. For example, the media ingestion module 210 accesses a repository of TBM content in the messaging platform 100 or from a content owner or content distributor. Sources of previously broadcast TBM received through the media ingestion module 210 may be segmented by the segmenting engine 220 and analyzed by the feature generator 230 to generate audio features stored in the historical repository 152.

III. B. Fingerprint Generation

The segmenting engine 220 partitions TBM (such as an ingested reference stream or an audio snippet) into segments to facilitate matching. The segmenting engine 220 generates reference audio segments from an ingested reference stream and test audio segments from a received audio snippet. To partition TBM, the segmenting engine 220 selects a start time and an end time for one or more segments. The segments may have the same duration for convenience. For example, the reference audio segments contain one minute of the reference stream and the test audio segments contain ten seconds of the audio snippet. The segmenting engine 220 generates segments staggered in time so that if one segment has a start time before the start time of a second segment, then the end time of the first segment is before the end time of the second segment. For example, a first reference audio segment has a start time of 5 seconds and an end time of 65 seconds, and a second reference audio segment has a start time of 35 seconds and an end time of 95 seconds.

The segmenting engine 220 may generate segments that overlap (e.g., one-minute reference audio segments beginning every thirty seconds, ten-second test audio segments beginning every second). Alternatively or additionally, the segmenting engine 220 generates segments so that the end time of a segment coincides with the start time of the next segment (e.g., one-minute reference audio segments beginning every minute, five-second test audio segments beginning every five seconds). The segmenting engine 220 need not generate segments that conform to a particular pattern, but generating segments with a simple pattern simplifies implementation. The segmenting engine 220 may generate test audio segments substantially in real time as streaming TBM is received (e.g., for concurrently broadcast TBM), or separately as a batch process on an audio snippet or a packet of streaming TBM (e.g., for previously broadcast TBM content, for stored TBM items).

The feature generator 230 generates audio features for TBM. Audio features generated for a reference stream are referred to as reference audio features, and audio feature generated for an audio snippet are referred to as test audio features. Various acoustic fingerprinting techniques use different methods to generate audio features. In one embodiment, the feature generator 230 generates an audio feature when the energy (e.g., the amplitude, loudness, sound power) of the TBM exceeds a threshold for a portion of time. For example, the feature generator 230 calculates energy from the cumulative or average energy (or amplitude) over a one-eighth second duration of the audio TBM. Generated audio features are associated with a feature time that indicates the time of the portion when the TBM exceeded the energy threshold. The feature generator 230 may also associate the audio features with other properties such as prominent frequencies and amplitudes of those frequencies at the feature time. For example, the feature generator 230 generates an audio feature when the energy within a frequency band exceeds an energy and then associates that audio feature with that frequency band. The feature generator 230 may generate audio features substantially in real time from streamed TBM (e.g., for concurrently broadcast TBM) or as a batch process on the audio snippet or a received packet of streamed TBM (e.g., for previously broadcast TBM, for stored TBM items).

The feature generator 230 associates a segment of TBM (e.g., reference audio segments or test audio segments) with audio features that it generates by analyzing and processing the audio segments. Each segment contains only the features analyzed as occurring between the start time of the segment and the end time of the segment. For example, if a segment starts at time t=60 seconds and ends at t=120 seconds, then the feature generator 230 associates that segment with audio features occurring at t=72 seconds, t=77 seconds, and t=94 seconds but not audio features occurring at t=31 seconds or t=121 seconds. The feature generator 230 may then recalculate the feature times with respect to the start time of the segment. For the previous example, the feature times at t=72 seconds, t=77 seconds, and t=94 seconds are recalculated with respect to 60 seconds to become feature times oft'=12 seconds, t'=17 seconds, and t'=34 seconds, respectively. Recalculating feature times with respect to the start time of a segment assists in compensating for misalignment between an audio snippet of a TBM event and a reference stream of that TBM event.

The feature generator 230 generates features by quantizing audio properties of the segment into discrete items of data. Example properties that may be included in features include a time and/or a time range of occurrence, a frequency and/or frequency ranges, and amplitude/power. For example, a reference audio segment of duration sixty segments is quantized into thirty time durations. In other words, quantizing a property rounds the value of that property to one of a discrete number of increments (e.g., feature times rounded down to the nearest multiple two seconds in the previous example) to further compensate for relatively small misalignments between an audio snippet and a reference stream. As another example, frequencies are quantized into frequency bands corresponding to semitones in a musical scale and then further clustered by semitone within an octave, resulting in twelve discrete frequencies. Such frequency quantization and clustering compensates for aliasing effects due to the sampling rate of the audio recording device of the client 105 or compression of the audio signal for transmission from the client 105 to the messaging platform 100.

The feature generator 230 may compress audio features of a segment (e.g., using a hashing algorithm) based on the properties of an audio feature to advantageously reduce the storage space of the audio feature and to decrease the computational complexity of comparing audio features across segments. If the segment is a reference audio segment, then the feature generator 230 stores the reference audio segment and its corresponding audio features in the real time repository 151 or the historical repository 152, as appropriate.

III. C. Segment Matching

The real time media matcher 250 and the historical media matcher 260 attempt to identify one or more matches between a test audio segment and one or more reference audio segments in the real time 151 and historical 152 media repositories. To compare or evaluate a match between a reference audio segment and a test audio segment, the media matcher 250 or 260 compares the features of each segment. The matching process may vary by implementation. Listed below are several examples of how matches may be determined. Upon detecting a match, the media matcher 250 or 260 identifies the TBM event associated with the matching reference audio segment. Hence, the media matchers 250 and 260 both identify a TBM event recorded by the client 105.

In one embodiment, the media matcher 250 or 260 determines a match to be present if one or more of the features in the test audio segment matches one or more features present in the reference audio segment, vice versa, or both. More specifically, two features from two different segments are is determined to be present in both segments if they have a threshold level of similarity with respect to one or more of their properties, examples of which include feature time, frequency, duration, and amplitude. As described above, quantization of properties facilitates this matching process, and quantization can be tuned to make matches comparatively more or less common, for example based on the number of false positives encountered in real time implementation.

In another embodiment, the media matcher 250 or 260 determines a match score indicating a confidence or degree of match between a test audio segment and each reference audio segment under consideration. The match score may be based on a number of features in the test audio segment that match a feature in the reference audio segment or vice versa, where two features match as described above. Alternatively, the media matcher 250 or 260 may determine the match score by computing a subscore based on the confidence or degree of match between each feature in the test audio segment and reference audio segment, vice versa, or both. Numerous different statistical methods may be used to compute the subscores for individual features matches. For example, the subscore may be a sum of the absolute value of the difference in value between each property of the features, normalized for each type of property. For example, if a test audio segment feature has an amplitude of 10 db, a frequency of 16.5 kHz, a start time of 5 seconds into the segment, and a duration of 0.5 seconds, and a reference audio segment feature has an amplitude of 8 db, a frequency of 16 kHz, a start time of 4.8 seconds into the segment, and a duration of 0.5 seconds, then the subscore SS computing the degree of match between those two features is equal to $SS=a\ (10-8)+b\ (16.5-16)+c\ (5-4.8)+d\ (0.5-0.5)$, where a, b, c, and d are normalization constants.

The number of reference audio segments stored in the real time TBM repository 151 is relatively few (e.g., between one and three per reference stream), so the real time media matcher 250 can advantageously complete this comparison substantially in real time. For real time processing, these comparisons may be completed concurrently by multiple processors or servers. The real time TBM repository 151 may be implemented as a data structure in the working memory of one or more servers, which beneficially reduces processing time to identify in real time an audio snippet as a concurrently broadcasting TBM event. Maintaining relatively few audio segments in the TBM repository 151 beneficially reduces working memory or disc space to store acoustic fingerprints including reference audio segments and reference audio features. The real time media matcher 250 may use distributed processing to compare reference audio segments in the real time TBM repository 151 with test audio segments of an audio snippet. Alternatively or additionally, real time media matcher 250 may employ batch processing (e.g., grouping acoustic fingerprints of multiple received audio snippets for comparison against reference audio streams).

The real time media matcher 250 maintains the real time repository 151 to ensure that its stored reference audio segments and their corresponding audio features are sufficiently recent (e.g., within the last 30 to 90 seconds). For example, the real time media matcher 250 removes a reference audio segment with a start or end time older than a threshold time. The real time media matcher 250 may also remove reference audio features associated with the removed reference audio segment or that have a feature time older than a threshold time. Hence, the real time repository 151 contains reference audio features and reference audio segments received within a threshold duration of the current time. The threshold duration of time may be varied to reflect the reference stream. For example, the threshold duration is one minute for live sports and twenty minutes for an hour-long television show that some media consumers record and then begin watching late to skip commercials. The real time media matcher 250 may move an insufficiently recent reference audio segment and its reference features to the historical repository 152. The real time media matcher 250 may dynamically vary the threshold duration of time in response to performance of the messaging platform 100. For example, if technical issues prevent moving older reference audio segments to the historical repository 152 or accessing reference audio segments therein, the real time media matcher 250 may defer moving these older reference audio segments until the historical repository 152 is available. The real time media matcher 250 may discard test audio segments that do not match a reference audio segment maintained or accessed by either the real time media matcher 250 or the historical media matcher 260.

The historical media matcher 260 identifies a match between an audio snippet and a previously broadcast TBM event using features of test audio segments and of reference audio segments stored in the historical repository 152. As described above, the historical repository 152 includes reference audio segments of reference streams too old for inclusion in the real time repository 151. The historical repository 152 may contain numerous reference audio segments and corresponding reference audio features (or other types of acoustic fingerprints) corresponding to numerous reference streams, so the historical repository 152 may include large quantities of data. The historical repository 152 may be implemented using one or more databases available to processors to match acoustic fingerprints of an audio snippet to acoustic fingerprints of reference streams or TBM items. Rather than matching against concurrently broadcasting events, the historical media matcher 260 enables recognition of a much wider swath of media, including television from a digital video record (DVR) or video-on-demand service, a movie or television show on a digital video disc (DVD) or online streaming service, or music stored on a mobile device or downloaded through a streaming service.

The historical media matcher 260 searches for reference audio segments associated with various ingested reference streams that match test audio segments of the audio snippet. Similarly to the real time media matcher 250, the historical media matcher 260 evaluates a match between a reference audio segment in the historical repository 152 and a test audio segment according to the number of matching features common to both segments. A reference audio feature matches a test audio feature if the properties of each feature being compared match, where the properties may include feature time, frequency, or amplitude. As described above, quantization of features properties facilitates this matching process, and quantization can be tuned to make matches comparatively more or less common, for example based on the number of false positives encountered in practice. Upon detecting a match, the historical media matcher 260 identifies the TBM event associated with the reference audio segment. The historical media matcher 260 may use distributed processing to compare reference audio segments in the historical TBM repository 152 with test audio segments of an audio snippet. Alternatively or additionally, the historical media matcher 260 may employ batch processing (e.g., grouping acoustic fingerprints of multiple received audio snippets for comparison with reference audio streams or other TBM items). Hence, the historical media matcher 260 identifies a previously broadcast TBM event recorded by the client 105.

Figure 3:
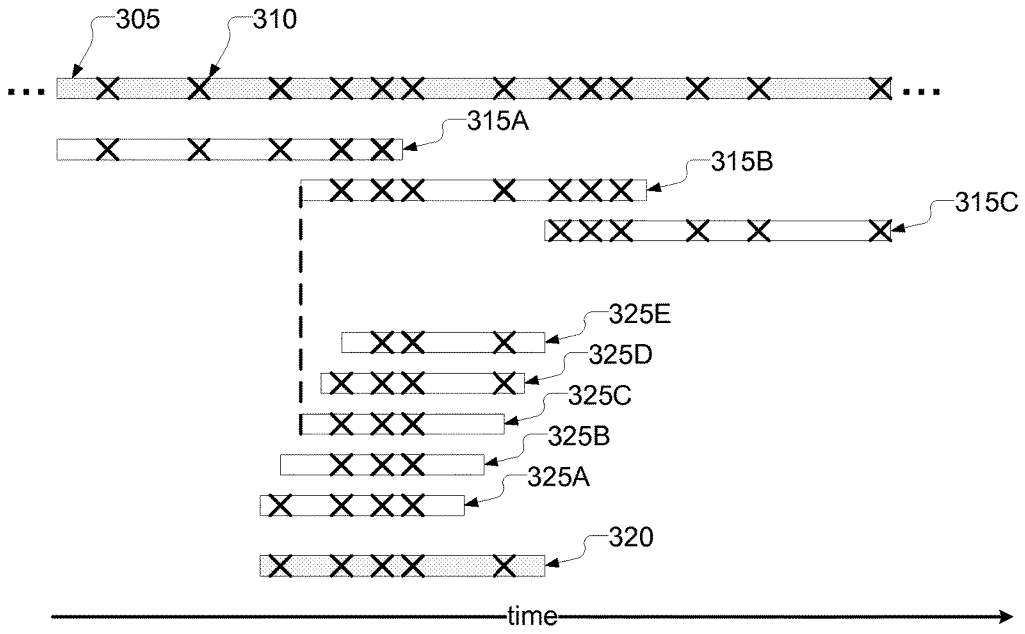
FIG. 3 is a conceptual diagram illustrating matching of an audio snippet to a reference audio stream of concurrently broadcasting time-based media, according to one embodiment.

Turning to FIG. 3, illustrated is a conceptual diagram illustrating matching of an audio snippet to a reference audio stream of concurrently broadcasting TBM, according to one embodiment. The diagram illustrates different audio segments aligned according to time with respect to a reference stream 305 of a TBM event. As illustrated, the reference audio stream 305 is assumed to begin and end outside the time periods illustrated in FIG. 3. The client 105 records an audio snippet 320 of a limited duration. The segmenting engine 220 segments the reference audio stream 305 into reference audio segments 315A-315C, and the segmenting engine 220 segments the audio snippet 320 into test audio segments 325A-E. The start time of a segment 315 or 325 corresponds to its left edge, and the end time of a segment 315 or 325 corresponds to its right edge. The TBM engine 150 does not know the relative temporal alignment of the reference audio stream 305 and the audio snippet 320, so the TBM engine 150 generates several temporally staggered test and reference audio segments so that ideally at least one test 325 and reference 325 segment combination are substantially aligned with respect to the features occurring in each segment.

The feature generator 230 identifies audio features 310 in the reference audio stream 305 and separately in the audio snippet 320. In FIG. 3, features 310 are generically marked as "X"s, though in practice it is expected that individual features will have multiple varying properties. The identified audio features 310 are associated with the segments 315 and 325. The feature times of the audio features 310 are recalculated with respect to the start time of their associated segments 315 and 325.

As above, as each test audio segment and its corresponding features are generated, the real time media matcher 250 compares the audio features between the test audio segment 325 and the reference audio segments 315 that have been temporarily stored in repository 151 to identify a matching reference audio segment. The historical media matcher 260 similarly compares the audio features between the test audio segment 325 and reference audio segments (not shown) that are stored by the historical repository 152. In the example of FIG. 3, the match is between the reference audio segment 315B from the real time media repository 151 and the test audio segment 325C. Because there is a match between a test audio segment 325 and a reference audio segment 315, the TBM engine recognizes that the audio snippet 320 contains a recording of a TBM event that is currently being broadcasted.

III. D. TBM Event Identification from Multiple Matching Reference Streams

The real time media matcher 250 and the historical media matcher 260 may each identify more than one matching reference audio segment from the TBM repository 148 that match a test audio segment. These matching reference audio segments may correspond to multiple different TBM events. In implementations where matching is binary, further processing is needed to determine which matching reference audio segment corresponds to the actually captured audio snippet. In implementations where matching is not binary but is instead (confidence) score based, it is possible that more one of the top matching reference audio segments may have comparable scores (e.g., within 5% or 10% or more) of each other. In this implementation, merely selecting the reference audio segment with the highest score may lead to incorrect results. Thus, although the scores initially indicate a best matching reference audio segment, further processing is beneficial to ensure the correct reference audio segment is identified.

Turning back to FIG. 2, the disambiguation module 270 resolves these types of ambiguities to identify a single reference audio segment and corresponding TBM event that matches the test audio segment. For clarity, as the disambiguation module 270 generally only disambiguates between reference audio segments already having been determined to match the test audio segment to within at least a threshold degree of confidence (depending upon the implementation as described above), references in the following section to identification or scoring of possible matching reference audio segments refer to matching after disambiguation, not the prior matching performed by media matchers 250 and 260 as described above.

In one embodiment, the disambiguation module 270 accomplishes disambiguation by further evaluating the test audio segment and reference audio segments to reduce the number of reference audio segments under consideration, in some cases down to a single match. To do this, the disambiguation module 270 performs a second fingerprinting step that identifies additional features (e.g., features that pass a lower energy threshold) and/or that quantizes feature properties differently (e.g., more finely) than was performed by the feature generator 230. The disambiguation module 270 then re-performs the matching or scoring process between the test audio segment and the reference audio segments under consideration using the new fingerprints and using any of the matching or scoring processes described above. The disambiguation module 270 identifies one or more new matching reference audio segments and in some instances ranks them according to their scores. The disambiguation module 270 then selects the single matching reference audio segment or selects the highest ranking reference audio segment as matching the test audio segment.

In the same or a different embodiment, the disambiguation module 270 may evaluate additional factors beyond audio features in disambiguating reference audio segments. For example, the client 105 or the account that captured the test audio segment may be associated with a geographic locality or geographic location coordinates (e.g., an inferred geographic location of the client device based on an account associated with the client device, a geographic location transmitted from the client device). Using an electronic program guide corresponding to the location, the disambiguation module 270 eliminates reference audio segments from consideration that do not correspond to an event broadcast in the identified geographic location. In another embodiment, this process may be performed by the media matchers 250 and 260 prior to initial matching in order to save processing time and reduce the number of reference audio segments that are considered for initial matching.

As another example, to perform disambiguation the disambiguation module 270 may alter the scores of reference audio segments, as provided by media matchers 250 and 260, according to the explicit or inferred interests of the account associated with the client 105 that captured the test audio segment. This may include interests inferred from content of messages authored by the account, interests inferred from interests of accounts connected to the account, explicit interests declared by an account holder of the account, and so on. These interests may be correlated with accounts associated with the events themselves. That is, a particular TV show may have an account on the real time messaging platform 100 that similarly includes its own interests inferred from the content of messages authored by the account, interests inferred from interests of accounts connected to the account, explicit interests declared by an account holder of the account, and so on. The disambiguation module 270 may adjust the score of a reference audio segment based on a degree of interest intersection or overlap between the interest of the account associated with client 105 and the account associated with each reference audio segment. For example, if the client 105 capturing the test audio segment is associated with an account that has authored messages referring to the TV AMERICAN IDOL, this may indicate an interest on the part of the account in that TV show. The disambiguation module 270 may use this interest to adjust the scores of reference audio segments associated with airings of AMERICAN IDOL such that it is more likely that those reference audio segments are identified as the single matching reference audio segment by the disambiguation module 270.

As another example, to perform disambiguation the disambiguation module 270 accesses the message repository 140 to identify messages that refer to the TBM event corresponding to each reference audio segment under consideration. The disambiguation module 270 determines the number of messages associated with each event. A message is associated with an event if it mentions the TBM event directly or indirectly, or contains a link as stored in the graph module 130 to the account associated with the TBM event. The disambiguation module 270 ranks the reference audio segments according to popularity as measured by the number of messages associated with the TBM event. The disambiguation module 270 then identifies the highest ranked reference audio segment as the single matching reference audio segment. This operation assumes, as a generalization, that a client 105 is more likely to have captured an audio snippet of a popular show, as tabulated by the real time messaging platform 100, than an unpopular show, all other things being equal. Consider an example where two reference audio segments are under consideration by the disambiguation module 270, one associated with a primetime airing of AMERICAN IDOL which is associated with thousands of messages within platform 100, another associated with a rerun of the first season of I LOVE LUCY airing at 2 am which is associated with only two messages within platform 100. Based on the number of messages associated with each TBM event, the disambiguation module 270 identifies the reference audio segment associated with the AMERICAN IDOL airing as the matching reference audio segment.

If after disambiguation, the disambiguation module 270 has identified a single matching reference audio segment from the reference audio segments provided by the real time media matcher 250 and the historical media matcher 260, the disambiguation module 270 selects the matching reference audio segment and provides it to the TBM engine 150 as a result. Because there is a match between the test audio segment and the identified reference audio segment, the TBM engine 150 recognizes that the audio snippet contains a recording of the TBM event of the identified reference audio segment.

However, if after disambiguation the disambiguation module identifies a matching reference audio segment from both the real time media matcher 250 and the historical media matcher 260, the disambiguation module 270 selects the matching reference audio segment provided by the real time media matcher 250 rather than the reference audio segment from the historical media matcher 260. This selection is performed because it is assumed that currently broadcasting events are likely to be what the user is viewing and capturing through client 105, rather than any historically broadcast content the user has access to. Further, it may also be assumed that if a user is experiencing historically broadcast content, it is not likely to temporally correspond to currently broadcast content, often because advertisements have been skipped, start and stop times vary from traditional hour and half hour event starting times, and so one. Stated simply, the disambiguation module 270 prefers identifying the audio snippet as a currently broadcasting TBM event (e.g., a re-run of a TV show) over a historical entry for that TV show.

III. E. Applications of TBM Event Identification

The analytics module 280 receives the TBM event identified by the disambiguation module 270 and stores an association between the TBM event and the account of the client 105. For example, this association is stored in the account repository 146. Alternatively or additionally, the analytics module 280 stores the association in the connection graph repository 142 as an implicit connection from the account associated with the client device to one or more accounts associated with the TBM event. For example, accounts associated with a sports TBM event include accounts of the broadcasting network, the sports league, the sports teams, and prominent players on the sports teams.

The analytics module 280 may aggregate associations between accounts and a concurrently broadcast TBM event to identify audience response metrics corresponding to the identified TBM event, such as a total number of identifications of the TBM event. The analytics module 280 may also calculate the audience response metric from an aggregate number of messages authored about the identified TBM event. The analytics module 280 may send the audience response metrics for display to the client 105. For example, such a message may contain an identification of the TBM event and a graph. The frontend module 110 provides an interface to display the audience response metrics. For example, the client 105 displays a page about a television program. The page includes a graph depicting the audience response metrics and a set of messages related to the television program.

The companion content module 290 prepares additional interfaces for presentation to an account holder through a client 105. In response to identifying an audio snippet, the companion content module 290 presents content corresponding to the TBM event. This event content may include audience response metrics, user-generated content related to the TBM event, or content uploaded by an account officially associated with the TBM event. For example, the event content is an event page presenting screenshots, images, video, audio, or other content related to the TBM event. Continuing the example, the event page displays a clip of audio or video from thirty seconds before the audio snippet was recorded to provide for a personalized, on-demand instant replay of a broadcast TBM event.

The companion content module 290 may designate the client 105 (or an associated account) that submitted an audio snippet as a synchronized account with respect to the identified TBM event. The companion content module 290 then serves content relevant to synchronized accounts while the TBM event is presently ongoing or while the synchronized account is presumed or inferred to be consuming the TBM event. The content may be synchronized in time based on the time the audio snippet was received and the time of the identified reference audio segment of the TBM event. For example, the companion content module 290 presents musical artist commentary about a song in synchronization with playing the song from a broadcast concert. The companion content module 290 may designate additional clients 105 (and their associated accounts) as synchronized to the identified TBM event based on sharing a common internet protocol (IP) address with the client 105 or a common geographic location with the client 105.

The companion content module 290 may stop designating a client 105 as synchronized to the TBM event according to an end time of the TBM event from a program guide. The companion content module 290 may synchronize the client 105 to another TBM event that is broadcast after the identified TBM event, according the program guide.

The companion content module 290 may serve relevant advertisements to the synchronized clients 105 devices based on the associated TBM event. For example, a message including an advertisement determined to be relevant to the TBM event can be inserted into a stream of messages displayed on the client 105. The companion content module 290 (or a dedicated advertising module) aligns advertisements with a TBM event by calculating a confidence score representing a relevance of the advertisement to the account or TBM event. The confidence score may be calculated based on semantic language processing of text associated with the advertisement, keywords associated with the advertisement or event, or keywords associated with the account. The companion content module 290 reduces a weight of the TBM event in calculating confidence scores as time elapses after the TBM event identification to reflect that an account holder may have stopped watching the TBM event. Overall, the companion content module 290 generates relevant content served to the client 105 while the associated account holder is consuming the TBM.

IV. Identification of an Audio Snippet of Concurrently Broadcast TBM

Figure 4:
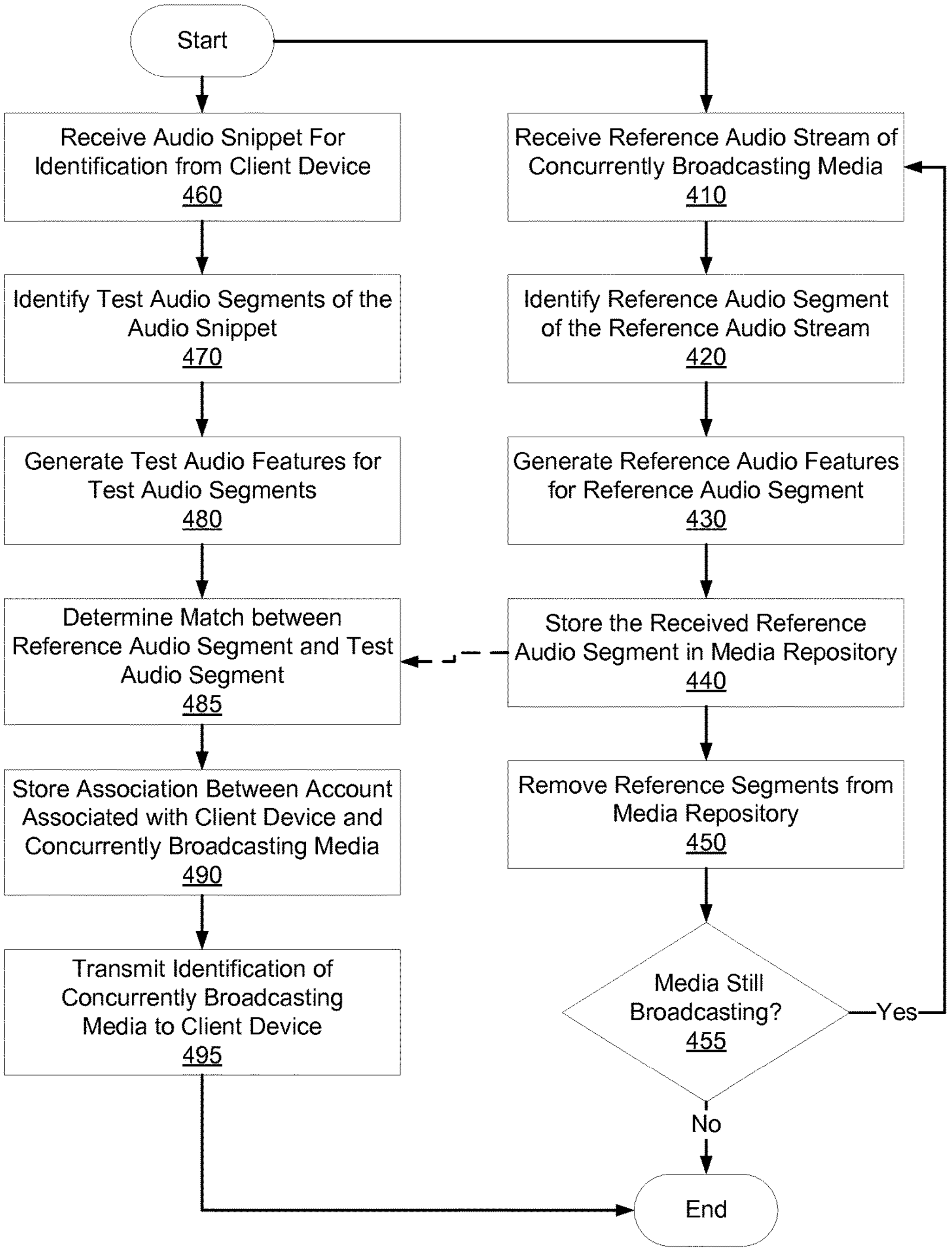
FIG. 4 is a flowchart of a method for identifying an audio snippet of a concurrently broadcast time-based media event, according to one embodiment.

FIG. 4 is a flowchart of a method for identifying an audio snippet of a concurrently broadcast TBM event, according to one embodiment. The media ingestion module 210 receives 410 a reference audio stream of a concurrently broadcasting TBM event from a client 105 associated with an account. The segmenting engine 220 identifies 420 a reference audio segment of the reference audio stream. The identified reference audio segment may begin at a later start time than a previously identified reference audio segment, and the identified reference audio segment may end at a later end time than the previously identified reference audio segment. The reference audio segments may have the same reference audio segment duration.

The feature generator 230 generates 430 reference audio features for the reference audio segment based on a portion of the reference audio stream making up the reference audio segment. Each of the reference audio features are associated with a reference feature time calculated with respect to the reference audio segment's start time. The feature generator 230 stores 440 the reference audio segment and its reference audio features in the real time TBM repository 151.

The real time media matcher 250 may remove 450 reference audio segments from the real time repository 151 that are older than a threshold time. Alternatively or additionally, the real time media matcher 250 removes 450 the oldest reference audio segments in response to a total number of audio features in the real time repository 151 exceeding a threshold. The removed reference audio segments may be stored in the historical TBM repository 152 or discarded. The TBM engine 150 determines whether 455 the TBM is still concurrently broadcasting. If 455 the TBM is concurrently broadcasting, then the TBM engine 150 continues receiving the reference audio stream, identifying reference audio segments, and generating reference audio features. If 455 the TBM event is no longer broadcasting, the process ends with respect to that TBM event.

At a time within the time period in which the reference audio stream is received 410, the messaging platform 100 receives 460 an audio snippet for identification from a client device 105. The segmenting engine 220 identifies 470 test audio segments of the received audio snippet. Each identified test audio segment begins at a successively later start time than a previously identified test audio segment, and the each identified test audio segment ends at a later end time than the previously identified test audio segment. The test audio segments may have the same test audio segment duration. The feature generator 230 generates 480 test audio features for the test audio segments based on portions of the test audio stream making up each test audio segment. Each of the test audio features are associated with a test feature time calculated with respect to the test reference audio segment's start time.

Using the determined test audio features and the identified test audio segments, the real time media matcher 250 determines 485 that one of the test audio segments matches one of the stored reference audio segments. This determination is based on a match between the test audio features and the reference audio features. The real time media matcher 250 finds a match between the test feature times within the test audio segment and the reference feature times within the reference audio segment (i.e., the recomputed feature time relative to the start time of the segment). To determine the match, the real time media matcher 250 may first hash the test features and reference features based on their respective feature times or other properties such as amplitude and frequency. As part of this determination, the real time media matcher 250 may attempt to match test audio segments against reference audio segments corresponding to additional reference audio streams. The real time media matcher 250 may also match test audio segments against reference audio segments of previously broadcast TBM events from the historical repository 152. If a given test audio segment does not match reference streams, then the real time media matcher 250 may discard the test audio segment.

The TBM engine 150 may compare the audio snippet to multiple reference audio streams corresponding to different TBM events. The real time media matcher 250 and the historical media matcher 260 may identify multiple matching reference audio segments that match at least one of the test audio segments. To determine which of the matching reference audio segments is a best match, the disambiguation module 270 determines scores for matches between reference audio segments and test audio segments based at least in part on a number of matches between reference feature times and test feature times (or other feature properties). The disambiguation module 270 then selects one of the matching reference audio segments based on the determined scores. The disambiguation module 270 may modify these scores. The disambiguation module 270 may obtain interests or other account information of an account associated with the client 105 from the account repository 146. The disambiguation module 270 may then modify the determined scores based on correlations between interests associated with currently broadcasting TBM events and interests associated with TBM events associated with the recently received reference audio segments.

The TBM engine 150 may also include filtering of reference audio streams to avoid unnecessary processing to match against streams an account is unlikely to encounter. For example, the TBM engine 150 obtains a geographic location associated with the client 105, and applies a filter to the reference audio stream to ensure that the reference audio stream does not correspond to a TBM event unavailable to client 105 in the obtained geographic location.

Based on the determination of the matching segment and corresponding TBM event, the analytics module 280 stores 490 an association that the account associated with the client 105 is listening to the concurrently broadcasting TBM event. The frontend module 110 transmits 495 an identification to the client 105 of a matching concurrently broadcasting TBM event corresponding to the matching reference stream.

V. Identification of an Audio Snippet of an Unknown Media Item

Figure 5:
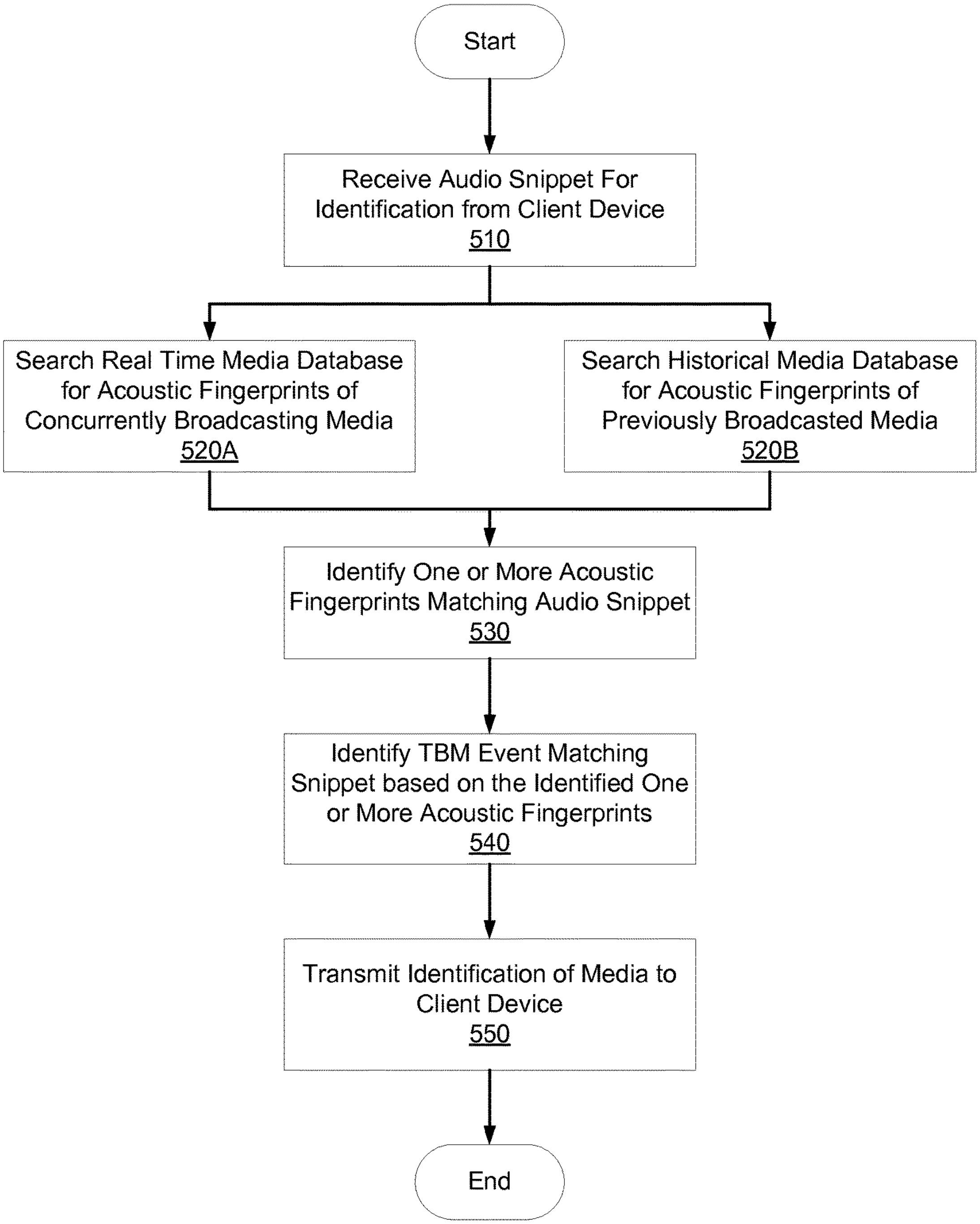
FIG. 5 is a flowchart of a method for identifying an audio snippet of time-based media, according to one embodiment.

FIG. 5 is a flowchart of a method for identifying an audio snippet of TBM, according to one embodiment. The messaging platform 100 receives 510 a request from a client 105 to identify a TBM event. This request includes an audio snippet recorded or otherwise obtained by the client 105. The TBM engine 150 searches 520A a real time TBM repository 151 containing acoustic fingerprints of currently broadcasting TBM events. Concurrently with searching the real time TBM repository 152, the TBM engine 150 searches 520B a historical TBM repository 152 containing acoustic fingerprints of previously broadcasted TBM events. The TBM engine 150 identifies 530 one or more matching acoustic fingerprints from the real time TBM repository 151 or the historical TBM repository 152 based on acoustic fingerprints of the audio snippet. The TBM engine 150 also identifies 540 a TBM event based on the one or more matching acoustic fingerprints. The frontend module 110 transmits 550, to the client 105, an identification of the matching TBM event in response to the request.

The frontend module 110 may also transmit to the client 105 event content corresponding to the identified TBM event in response to identifying the matching TBM event. The TBM engine 150 may also store an association between an account associated with the client 105 and the identified matching TBM event in the account repository 146. If the TBM engine 150 determines that the TBM event is still ongoing, then the messaging platform 100 may designate the client 105 as synchronized to the TBM event and select advertisements relevant to the TBM event. The frontend module 110 transmits these selected advertisements to the client 105 while the client 105 is designated as synchronized to the TBM event.

VI. Computing Machine Architecture

Figure 6:
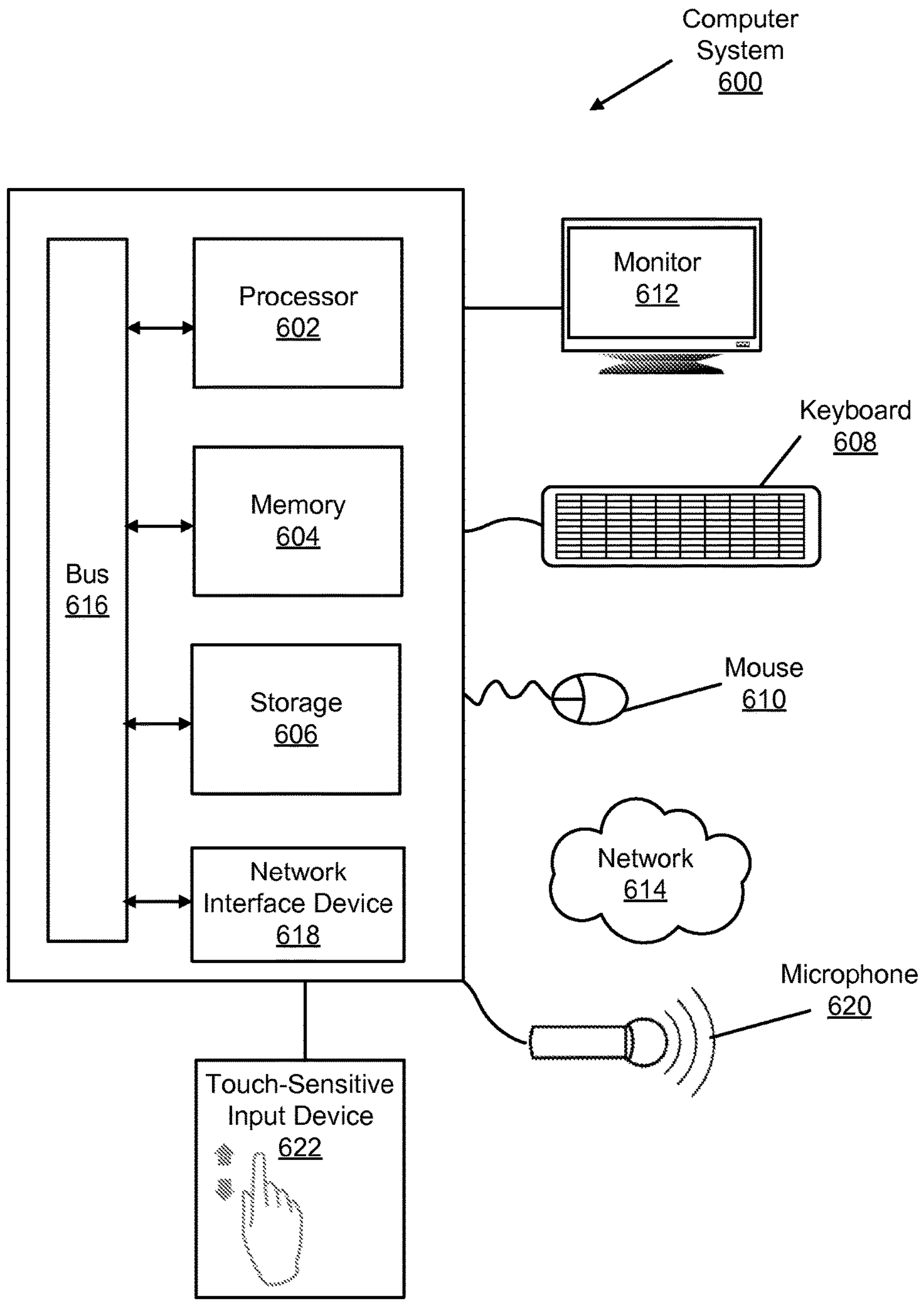
FIG. 6 illustrates components of an example machine able to read instructions from a machine-readable medium and execute them in a processor (or controller), according to one embodiment.

FIG. 6 illustrates components of an example machine able to read instructions from a machine-readable medium and execute them in a processor (or controller), according to one embodiment. Specifically, FIG. 6 shows a diagrammatic representation of a machine in the example form of a computer system 600 within which instructions (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet, a set-top box (STB), a smart phone, a web appliance, a network router, switch or bridge, or any machine capable of executing instructions (sequential or otherwise) that specify actions to be taken by that machine. For example, the client 105 is implemented as a smart phone, and the messaging platform 100 is implemented as a server, but these may be implemented by other computer systems 600. Further, while only a single machine is illustrated, the term "machine" shall also be taken to include any collection of machines that individually or jointly executes instructions to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory (or storage) 606, which are configured to communicate with each other via a bus 616. The computer system 600 may further include graphics display unit (or monitor) 612 (e.g., a plasma display panel (PDP), a liquid crystal display (LCD), a projector, or a cathode ray tube (CRT)). The computer system 600 may also include an alphanumeric input device 608 (e.g., a keyboard), a cursor control device 610 (e.g., a mouse, a trackball, a joystick, a motion sensor, or other pointing instrument), and a network interface device 618 (e.g., a network adapter), which also are configured to communicate via the bus 616.

The computer system 600 may include input devices such as a microphone 620 or other audio input device for recording audio snippets or otherwise converting sound waves to electrical signals. The computer system 600 may also include a touch-sensitive input device 622 (e.g., a touchscreen, a projected keyboard, an interactive surface), which may be integrated with the display unit 612. Various implementations may omit components of the example computer system 600; for example, the messaging platform 100 omits the microphone 620 and the touch-sensitive input device 622.

The storage 606 includes a machine-readable medium on which are stored instructions embodying any one or more of the methodologies or functions described herein. The instructions (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions may be transmitted or received over a network 614 via the network interface device 618.

While machine-readable medium is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed embodiments beneficially allow for identification of an ongoing stream of audio content. Conventional fingerprinting techniques match a complete copy of an unknown media item to a complete copy of another item in a media repository. Such techniques are ill-equipped to handle temporal misalignment between the unknown item and the matching item in the media repository. Temporal misalignment may be overcome with computationally expensive methods that are ill-suited to a real time messaging platform environment. The TBM engine 150 dynamically recomputes hashes of features with respect to various reference audio segments to avoid misalignment without extensive computation, suitable for real time identification of an audio snippet.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. One or more steps of the processes or methods described herein (e.g., those illustrated in FIGS. 4 and 5) are repeated concurrently by multiple threads. Thus, one or more of the steps can be performed serially, in parallel, and/or by a distributed system, in accordance with various embodiments of the invention.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. For example, the functionality of the data repositories or modules (e.g., the TBM engine 150) may performed, partially or entirely, by the social media platform 100, the client 105, or another hardware device (e.g., a server).

The data repositories (e.g., 140, 142, 144, 146, 148) may be implemented as a database and/or storage service residing on one or more servers. For example, one or more of the data repositories may be implemented as a storage service using service-oriented architecture (SOA), a distributed database management system (DBMS), a clustered database, a standalone flat file, and/or any storage software residing on one or more physical storage devices. Examples of a storage device may include, but are not limited to, a hard disk drive, a solid state drive, and/or other memory device.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for TBM identification with a real time messaging platform through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

receiving, at a real-time messaging platform comprising a plurality of accounts, a reference audio stream of a time-based media (TBM) event;

identifying reference audio segments of the reference audio stream, having different start times and end times;

generating a plurality of reference audio features based on a plurality of inclusion conditions for each of the reference audio segments, each reference audio feature associated with a reference feature time and comprising a plurality of reference audio properties;

receiving, at the real-time messaging platform, an audio snippet for identification from a client device, the client device associated with one of the accounts;

identifying, by a computer processor, test audio segments of the audio snippet for identification, the test audio segments at least partially overlapping each other in time;

generating, by the computer processor, a plurality of test audio features based on the inclusion conditions for each of the test audio segments, each test audio feature associated with a test feature time and comprising a plurality of test audio properties;

determining, that one or more test audio features of a first one of the test audio segments matches one or more reference audio features of a first one of the reference audio segments, the determination comprising;

comparing the test feature time of a first one of the test audio features and the reference feature time of a first one of the reference audio features, and comparing a first of the test audio properties of the first test audio feature to the a first of the reference audio properties of the first test audio feature;

determining that the first reference audio segment including at least the first reference audio feature matches the first test audio segment including at least the first test audio feature; and storing, in response to determining that the test audio segment matches the reference audio segment, an association between the account and TBM event.

2. The method of claim 1 further comprising:

maintaining a repository of reference audio segments comprising reference audio segments having one of: start times after a threshold time and end times after the threshold time, the threshold time determined relative to a current time, the reference audio segment contained in the repository of reference audio segments.

3. The method of claim 1, wherein determining that the first test audio segment matches the first reference audio segment comprises:

comparing the first test audio segment with a plurality of additional reference audio segments identified from a plurality of additional reference audio streams of a plurality of additional concurrently broadcasting TBM events; and selecting a final reference audio segment based on a best match between the first reference audio segment and the first test audio segment over matches between the first test audio segment and the plurality of additional reference audio segments.

4. The method of claim 3, wherein determining that the first test audio segment matches the final reference audio segment comprises:

identifying a plurality of matching candidate reference audio segments from the plurality of additional reference audio segments; and selecting the final reference audio segment based on the best match between the matching candidate reference audio segments and the first test audio segment based on at least one of:

audio features of the plurality of additional reference audio segments having more finely quantized features than the generated reference audio features and the generated test audio features, and audio features of the plurality of additional references audio segments are generated by applying a lower energy threshold than an energy threshold applied to generate the first reference audio features and the first test audio features.

5. The method of claim 1, further comprising:

transmitting, to the client device, an identification of the concurrently broadcasting TBM event corresponding to the reference audio stream.

6. The method of claim 1, wherein the plurality of reference audio features correspond to at least one of: amplitudes of the reference audio stream at the reference feature times, and frequencies of the reference audio stream at the reference feature times.

7. The method of claim 1, wherein the plurality of test audio features correspond to at least one of: amplitudes of the audio snippet at the test feature times, and frequencies of the audio snippet at the test feature times.

8. The method of claim 1, wherein determining that the reference audio segment matches the test audio segment comprises:

determining scores for matches between reference audio segments and test audio segments based at least in part on a number of the one or more test audio features matching the one or more reference audio features; and selecting the reference audio segment matching the test audio segment based on the determined scores.

9. The method of claim 8, wherein determining that the reference audio segment matches the test audio segment comprises:

obtaining interests of the account, the interests obtained from at least one of: interests inferred from content of messages associated with the account, interests inferred from interests of accounts connected to the account, and interests explicitly associated with the account; and modifying the determined scores based on correlations between interests associated with currently broadcasting TBM events and the obtained interests.

10. The method of claim 1, further comprising:

obtaining a geographic location associated with the client device, the geographic location obtained from at least one of: an inferred geographic location of the client device based on the associated account, and a geographic location transmitted from the client device; and applying a filter to the reference audio stream to ensure that the reference audio stream does not correspond to a TBM event unavailable to client devices in the obtained geographic location.

11. The method of claim 1, wherein each reference audio segment of the reference audio segments has a same reference audio segment duration and each test audio segment has a same test audio segment duration.

12. The method of claim 1, wherein the stored association between the account and the concurrently broadcasting TBM event is a connection from the account to another account associated with the concurrently broadcasting TBM event.

13. The method of claim 1 wherein the reference audio stream is received at a server from a currently broadcasting television show, live concert, or radio show.

14. The method of claim 1 wherein the reference audio segments are generated as the reference audio stream is received.

15. The method of claim 1 wherein the reference audio features are generated as the reference audio stream is segmented.

16. The method of claim 1 wherein the reference and inclusion conditions correspond to at least one of: an audio property exceeding a threshold, the audio property falling below the threshold, or the audio property deviating from an average value by a threshold amount.

17. A system comprising:

a processor; and a non-transitory computer readable storage medium configured to store instructions, the instructions executable by the processor and that when executed cause the processor to:

receive, at a real-time messaging platform comprising a plurality of accounts, a reference audio stream of a time-based media (TBM) event;

receive, at the real-time messaging platform, an audio snippet for identification from a client device, the client device associated with one of the accounts;

identify reference audio segments of the reference audio stream, having different start times and end times;

identify, by a computer processor, test audio segments of the audio snippet for identification, the test audio segments at least partially overlapping each other in time;

generate a plurality of reference audio features based on a plurality of inclusion conditions for each of the reference audio segments, each reference audio feature associated with a reference feature time and comprising a plurality of reference audio properties;

generate, by the computer processor, a plurality of test audio features based on the inclusion conditions for each of the test audio segments, each test audio feature associated with a test feature time and comprising a plurality of test audio properties;

determine, that one or more test audio features of a first one of the test audio segments matches one or more reference audio features of a first one of the reference audio segments, the determination comprising causing the processor to;

comparing the test feature time of a first one of the test audio features and the reference feature time of a first one of the reference audio features, and comparing a first of the test audio properties of the first test audio feature to the a first of the reference audio properties of the first test audio feature;

determine that the first reference audio segment including at least the first reference audio feature matches the first test audio segment including at least the first test audio feature; and store, in response to determining that the test audio segment matches the reference audio segment, an association between the account and TBM event.

18. The system of claim 17, wherein the instructions when executed by the processor further cause the processor to maintain a repository of reference audio segments comprising reference audio segments having one of: start times after a threshold time and end times after the threshold time, the threshold time determined relative to a current time, the reference audio segment contained in the repository of reference audio segments.

19. The system of claim 17, wherein the instructions when executed by the processor further cause the processor to transmit, to the client device, an identification of the concurrently broadcasting TBM event corresponding to the reference audio stream.

20. A non-transitory computer readable storage medium storing instructions for determining matching audio segments, the instructions when executed by a processor causes the processor to:

receive, at a real-time messaging platform comprising a plurality of accounts, a reference audio stream of a time-based media (TBM) event;

identify reference audio segments of the reference audio stream, having different start times and end times;

generate a plurality of reference audio features based on a plurality of inclusion conditions for each of the reference audio segments, each reference audio feature associated with a reference feature time and comprising a plurality of reference audio properties;

receive, at the real-time messaging platform, an audio snippet for identification from a client device, the client device associated with one of the accounts;

identify, by a computer processor, test audio segments of the audio snippet for identification, the test audio segments at least partially overlapping each other in time;

generate, by the computer processor, a plurality of test audio features based on the inclusion conditions for each of the test audio segments, each test audio feature associated with a test feature time and comprising a plurality of test audio properties;

determine, that one or more test audio features of a first one of the test audio segments matches one or more reference audio features of a first one of the reference audio segments, the determination comprising;

comparing the test feature time of a first one of the test audio features and the reference feature time of a first one of the reference audio features, and comparing a first of the test audio properties of the first test audio feature to the a first of the reference audio properties of the first test audio feature;

determine that the first reference audio segment including at least the first reference audio feature matches the first test audio segment including at least the first test audio feature; and store, in response to determining that the test audio segment matches the reference audio segment, an association between the account and TBM event.

21. The non-transitory computer readable storage medium of claim 20, wherein the instructions when executed by the processor further cause the processor to:

maintain a repository of reference audio segments comprising reference audio segments having one of: start times after a threshold time and end times after the threshold time, the threshold time determined relative to a current time, the reference audio segment contained in the repository of reference audio segments.

22. The non-transitory computer readable storage medium of claim 20, wherein determining that the first test audio segment matches the first reference audio segment further causes the processor to:

compare the first test audio segments with a plurality of additional reference audio segments identified from a plurality of additional reference audio streams of a plurality of additional concurrently broadcasting TBM events; and select a final reference audio segment based on a best match between the first reference audio segment and the first test audio segment over matches between the first test audio segment and the plurality of additional reference audio segments.

23. The non-transitory computer readable storage medium of claim 22, method of claim 3, wherein determining that the first test audio segment matches the final reference audio segment comprises:

identifying a plurality of matching candidate reference audio segments from the plurality of additional reference audio segments; and selecting the final reference audio segment based on the best match between the matching candidate reference audio segments and the first test audio segment based on at least one of:

audio features of the plurality of additional reference audio segments having more finely quantized features than the generated reference audio features and the generated test audio features, and audio features of the plurality of additional references audio segments are generated by applying a lower energy threshold than an energy threshold applied to generate the first reference audio features and the first test audio features.

24. The non-transitory computer readable storage medium of claim 20, wherein the instructions when executed by the processor further cause the processor to:

transmitting, to the client device, an identification of the concurrently broadcasting TBM event corresponding to the reference audio stream.

25. The non-transitory computer readable storage medium of claim 20, wherein the plurality of reference audio features correspond to at least one of: amplitudes of the reference audio stream at the reference feature times, and frequencies of the reference audio stream at the reference feature times.

26. The non-transitory computer readable storage medium of claim 20, wherein the plurality of test audio features correspond to at least one of: amplitudes of the audio snippet at the test feature times, and frequencies of the audio snippet at the test feature times.

27. The non-transitory computer readable storage medium of claim 20, wherein determining that the reference audio segment matches the test audio segment further causes the processor to:

determine scores for matches between reference audio segments and test audio segments based at least in part on a number of the one or more test audio features matching the one or more reference audio features; and select the reference audio segment matching the test audio segment based on the determined scores.

28. The non-transitory computer readable storage medium of claim 27, wherein determining that the reference audio segment matches the test audio segment further causes the processor to:

obtain interests of the account, the interests obtained from at least one of: interests inferred from content of messages associated with the account, interests inferred from interests of accounts connected to the account, and interests explicitly associated with the account; and modify the determined scores based on correlations between interests associated with currently broadcasting TBM events and the obtained interests.

29. The non-transitory computer readable storage medium of claim 20, wherein the instructions when executed by the processor further cause the processor to:

obtain a geographic location associated with the client device, the geographic location obtained from at least one of: an inferred geographic location of the client device based on the associated account, and a geographic location transmitted from the client device; and apply a filter to the reference audio stream to ensure that the reference audio stream does not correspond to a TBM event unavailable to client devices in the obtained geographic location.

30. The non-transitory computer readable storage medium of claim 20, wherein each reference audio segment of the reference audio segments has a same reference audio segment duration and each test audio segment has a same test audio segment duration.

31. The non-transitory computer readable storage medium of claim 20, wherein the stored association between the account and the concurrently broadcasting TBM event is a connection from the account to another account associated with the concurrently broadcasting TBM event.

* * * * *